(12) United States Patent
Russo

(10) Patent No.: US 7,970,763 B2
(45) Date of Patent: Jun. 28, 2011

(54) SEARCHING AND INDEXING OF PHOTOS BASED ON INK ANNOTATIONS

(75) Inventor: Thomas P. Russo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 11/357,022

(22) Filed: Feb. 21, 2006

(65) Prior Publication Data

US 2007/0196033 A1    Aug. 23, 2007

(51) Int. Cl.
G06F 7/00 (2006.01)
G06F 17/30 (2006.01)

(52) U.S. Cl. ........................ 707/736; 707/706
(58) Field of Classification Search .................. 707/1–3, 707/104.1
See application file for complete search history.

(56) References Cited

U.S. PATENT DOCUMENTS

| | | | |
|---|---|---|---|
| 5,592,608 A | 1/1997 | Weber et al. | |
| 5,832,474 A * | 11/1998 | Lopresti et al. | 707/2 |
| 6,108,655 A * | 8/2000 | Schleimer et al. | 707/10 |
| 6,279,014 B1 | 8/2001 | Schilit et al. | |
| 6,606,398 B2 | 8/2003 | Copper | |
| 6,741,864 B2 | 5/2004 | Wilcock et al. | |
| 6,826,305 B2 | 11/2004 | Zhu | |
| 6,859,909 B1 | 2/2005 | Lerner et al. | |
| 7,688,827 B2 * | 3/2010 | Fujii | 370/394 |
| 7,778,464 B2 * | 8/2010 | Lee et al. | 382/185 |
| 2002/0055955 A1 * | 5/2002 | Lloyd-Jones et al. | 707/512 |
| 2004/0120606 A1 * | 6/2004 | Fredlund | 382/305 |
| 2004/0174434 A1 * | 9/2004 | Walker et al. | 348/211.3 |
| 2004/0201602 A1 * | 10/2004 | Mody et al. | 345/700 |
| 2005/0018082 A1 * | 1/2005 | Larsen et al. | 348/563 |
| 2005/0055344 A1 * | 3/2005 | Liu et al. | 707/3 |
| 2005/0154707 A1 * | 7/2005 | Napper et al. | 707/3 |
| 2005/0182760 A1 | 8/2005 | Lee et al. | |
| 2008/0007788 A1 * | 1/2008 | Good et al. | 358/302 |
| 2008/0297517 A1 * | 12/2008 | Larsen et al. | 345/473 |

FOREIGN PATENT DOCUMENTS

JP   2000-112959   *   4/2000

OTHER PUBLICATIONS

Ken Milburn, "Use Special Names When Saving Digital Photos," <http://www.graphics.com/modules.php?name=Sections&op=view article&artid=219>; May 2, 2005, 5 pages.

(Continued)

Primary Examiner — Fred I Ehichioya
Assistant Examiner — Loan T Nguyen
(74) Attorney, Agent, or Firm — Workman Nydegger

(57) ABSTRACT

New ways to organize and search for digital photos are described. Electronic ink may be written on a photo and associated with the photo or only a portion of the photo. The written ink is recognized and stored as photo file metadata. Once photos and/or photo portions have been annotated with ink, the user may search and organize the photos and/or photo portions based on the ink annotations. The user may be presented with search results that include entire photos that are relevant to the search, and/or just those portions of photos that are relevant to the search. In response to a search request, a set of simultaneously displayed search results may be displayed. Alternatively or in addition, an automated slideshow may be implemented, presenting the search results in a sequential fashion.

15 Claims, 4 Drawing Sheets

OTHER PUBLICATIONS

"W3C Publishes InkML and EMMA Working Drafts for the Multimodal Interaction Framework," <http://xml.coverpages.org/ni2004-09-28-a.html>; first date of publication unknown, but prior to Sep. 28, 2004; 5 pages.

Gregory Russell, et al., "Ink Markup Language," <http://www.w3.org/TR/2004/WD-InkML-20040223/>, Feb. 23, 2004; 54 pages.

Douglas A. Kerr, P.E., "Annotation in Digital Image Files," <http://doug.kerr.home.att.net/pumpkin/Annotation.pdf>, Issue 1, May 22, 2004, pp. 1-16.

* cited by examiner

SEARCHING AND INDEXING OF PHOTOS BASED ON INK ANNOTATIONS

BACKGROUND

With the growing popularity of digital cameras, photos are more commonly stored electronically on computers instead of physically on paper. User interfaces have been developed to allow a user to manage and view his or her photos electronically. It is typical today for a user who stores digital photos to maintain hundreds, if not thousands, of photos. It is therefore becoming more of a challenge to organize stored photos and to find a particular photo of interest.

There recently has been a trend freeing the user from explicitly organizing photos and other media, and instead providing for the automatic organizing of photos based on their metadata. For instance, a user currently may organize photos by the date the photo was taken. However, conventional photo organization interfaces are limited and are in dire need of improvement.

SUMMARY

Aspects of the present invention are directed to new ways to organize and search for digital photos. Electronic ink may be written on or otherwise in association with a photo to electronically label photos, or even portions of photos. Unlike other forms of metadata, the use of ink involves an intermediate processing step: handwriting recognition, which allows the ink to be searched and used like any other text-based metadata. Such recognition may be performed in the background (e.g., in real time while the user is writing the ink) or after the ink has been completed. Thus, the user may simply write on the photo, for example, and in response the written ink will be recognized and the ink and/or recognized results will be stored as metadata for the photo file. The recognition results may also be automatically indexed to provide faster search capabilities. Thus, ink may now be considered a type of metadata that a user will be able to add to digital photos.

In response to a user adding an ink annotation to a photo or photo portion, the ink is recognized and may be automatically indexed. The user can then search for a desired photo(s) or portion(s) thereof using either an ink or text search criterion. Extending search and organize capabilities to ink inserted into digital photos may therefore dramatically enhance the photo experience. The user may be presented with search results that include entire photos that are relevant to the search, and/or just those portions of photos that are relevant to the search. The latter may be useful where photos are crowded with multiple subject matter elements (e.g., a group of people) and the user is interested in only one aspect of the photo (e.g., a single person in the group).

In response to a search request, a set of simultaneously displayed search results (such as thumbnails) may be displayed. Alternatively or in addition, an automated slideshow may be implemented, presenting the search results in a sequential fashion.

These and other aspects of the disclosure will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Illustrative Computing Environment

Figure 1:
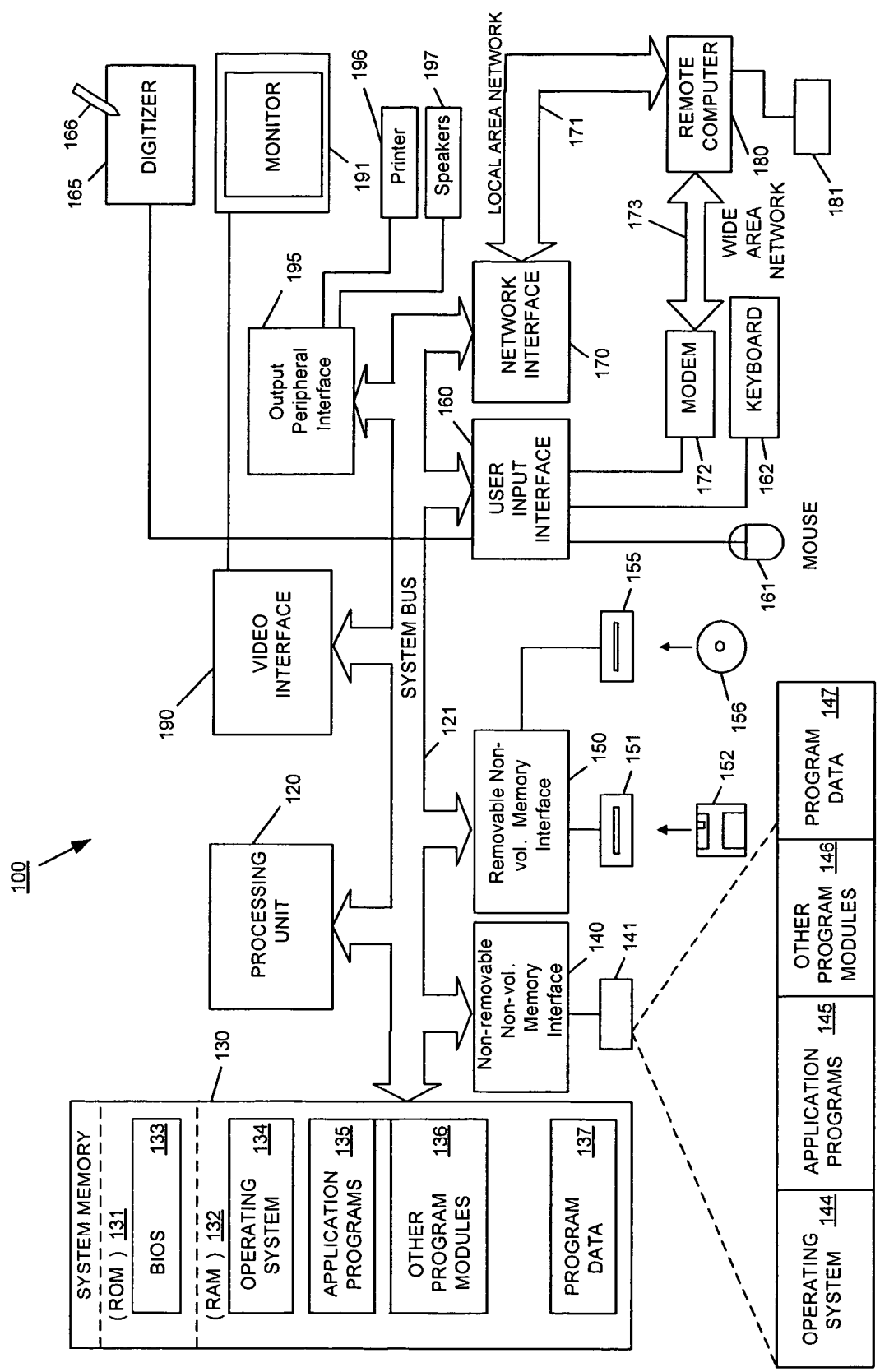
FIG. 1 is a functional block diagram of an illustrative computing environment.

FIG. 1 illustrates an example of a suitable computing system environment 100 in which aspects as described herein may be implemented. Computing system environment 100 is only one example of a suitable computing environment and is not intended to suggest any limitation as to the scope of use or functionality of various aspects as described herein. Neither should computing system environment 100 be interpreted as having any dependency or requirement relating to any one or combination of components illustrated in illustrative computing system environment 100.

One or more other general purpose or special purpose computing system environments or configurations may be used. Examples of well known computing systems, environments, and/or configurations that may be suitable include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the disclosure herein may be described in the general context of computer-executable instructions, such as program modules, stored on one or more computer-readable media and executable by a computer. Generally, program modules include routines, programs, objects, components, data structures, etc. that perform particular tasks or implement particular abstract data types. Embodiments discussed herein may also be operational with distributed computing environments where tasks are performed by remote processing devices that are linked through a communications network. In a distributed computing environment, program modules may be located in both local and remote computer-readable media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer-storage media and communication media. Computer-storage media are tangible media, and may include volatile, nonvolatile, removable, and non-removable media implemented in any method or technology for storage of information such as computer-readable instructions, data structures, program modules or other data. For example, computer-storage media includes random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can be accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-storage media, are both intended to be included within the scope of the term "computer-readable medium" as described and claimed herein.

System memory 130 includes computer-readable storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet computer. For example, computer 100 may be configured as a tablet computer or a handheld device such as a PDA where touch-sensitive device 165 would be considered the main user interface. In such a configuration touch-sensitive device 165 may be considered to include computer 100. Tablet computers are well-known. Tablet computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Figure 2:
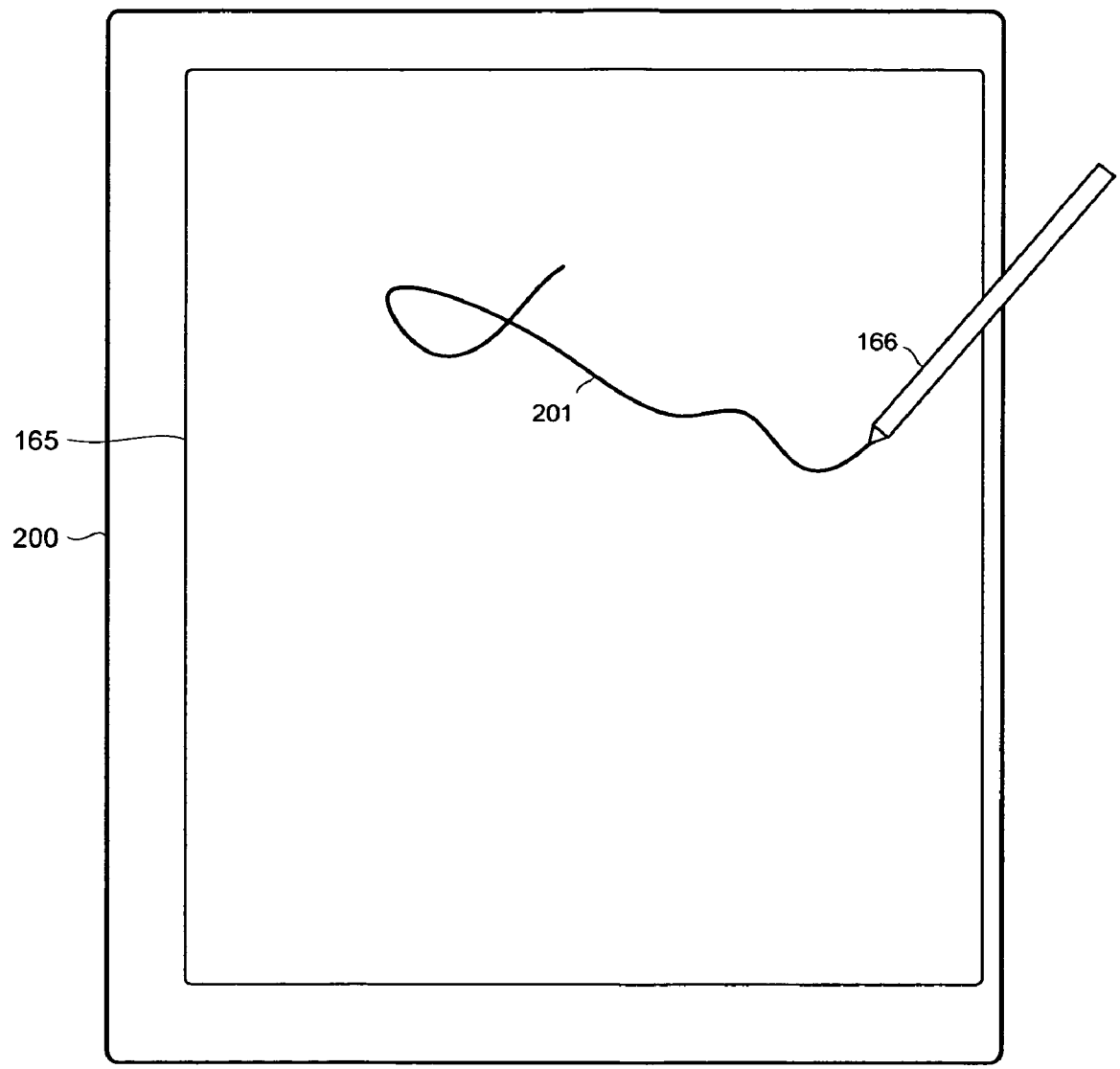
FIG. 2 is a plan view of an illustrative tablet computer.

Referring to FIG. 2, some or all of computer 100 may be embodied as a tablet computer 200 as shown. Here, tablet computer 200 includes touch-sensitive device 165 (which in this example is a touch-sensitive screen) and stylus 166. In response to the user moving stylus 166 along touch-sensitive screen 165, tablet computer 200 may cause electronic ink 201 (also referred to herein simply as "ink") to be displayed on touch-sensitive screen 165, following the movement of stylus 166. The electronic ink may be stored as electronic ink and/or recognized as text where the electronic ink includes handwritten letters, words, etc.

Ink-Based Photo Labels

The user may associate one or more handwritten ink entries with a portion of a photo and/or with the entirety of a photo. Once associated, the ink and/or its recognized text may be indexed and/or searched, and the search results may include the displaying of associated photos and/or portions thereof. Examples of these features will now be discussed with reference to various figures. In discussing these features, all actions involved, such as but not limited to, receiving user input, responding to user input, displaying, searching, storing information, and making decisions, may be performed by computer 100 as instructed by software embodied as computer-executable instructions. The computer-executable instructions may be stored on a computer-readable medium such as RAM 132, ROM 131, and/or disk 156. The software may be part of operating system 134, one or more application programs 135, and/or one or more other program modules 136.

Figure 3:
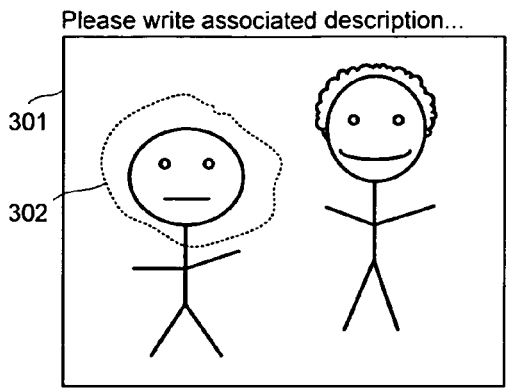
FIGS. 3-7 are sequential illustrative screenshots taken during the addition of various handwritten ink labels to a photo.

Referring to FIG. 3, a photo 301 may be selected by the user from a plurality of photos, and the selected photo 301 may be displayed in full or as a thumbnail. The user may then select a portion 302 of photo 301 using a graphical or other tool. For example, a lasso tool may be used to define the boundary of portion 302. Or, the user may directly draw the boundary of portion 302 using stylus 166. In the illustrated example, the boundary of portion 302 is displayed as a broken line. However, portion 302 may be visually indicated to the user in any of a number of ways. For instance, portion 302 may be indicated by displaying a solid line along its border, or portion 302 may be highlighted or otherwise visually distinguished from the remainder of photo 301.

Regardless of how the extent of portion 302 is defined by the user, in response to the user input defining and selecting portion 302, computer 100 may display a request that the user provide an input to be associated with portion 302. For instance, as shown in FIG. 3, computer 100 may display, "Please write associated description . . . ". This is a signal to the user that the user may now provide handwritten, typewritten, or other input to be associated with portion 302. Such associated input is also referred to herein as a label for portion 302.

Figure 4:
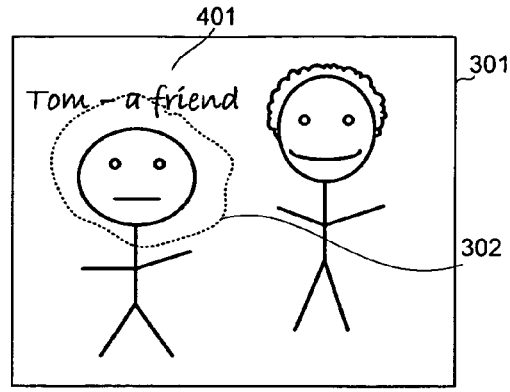

In the illustrated example, the user has circled the face of a person (in this case, Tom) as portion 302 using stylus 166, and so now (referring to FIG. 4) the user hand-writes in ink label 401, "Tom—a friend", on photo 301 using stylus 166. Label 401 may be provided anywhere on photo 301, and still be associated with portion 302. In this case, label 401 is written such that it is partially written in portion 302. However, label 401 may be written completely inside portion 302 or completely outside portion 302. In the present example, the user has written this particular label 401 so that it can later be searched based on words in label 401.

Once the user has entered label 401, computer 100 performs handwriting recognition on label 401, and stores the original ink input label 401 and/or the recognized text resulting from ink recognition as a metadata property for photo 301. In addition, computer 100 may place the recognized text (or the individual words in the recognized text) in a maintained searchable index. This indexing may occur when the user has completed entry of label 401, or it may occur dynamically and in real time while the user is writing label 401.

Figure 5:
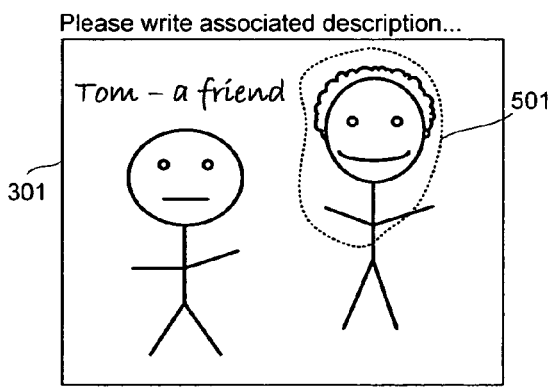
Figure 6:
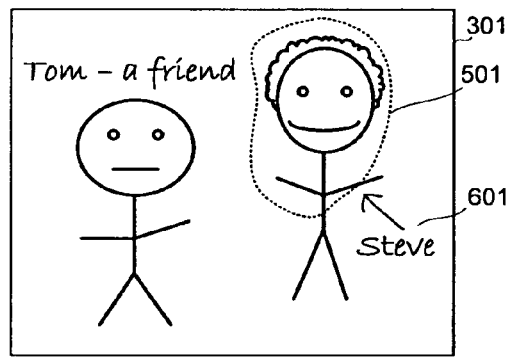

Referring to FIG. 5, the user may next choose another portion 501 of photo 301 for labeling, and repeat the process. In this case, referring to FIG. 6, the user has circled the upper body of another person (Steve) and has hand-written a label 601 in ink, and so the user wishes to identify this person (in this case, by writing "Steve" with an arrow on photo 301). In response, label 601 is recognized, and label 601 and/or its recognized text is associated with portion 501. In addition, the recognized text (or the individual words in the recognized text) resulting from recognition of label 601 may be placed in the index.

Figure 7:
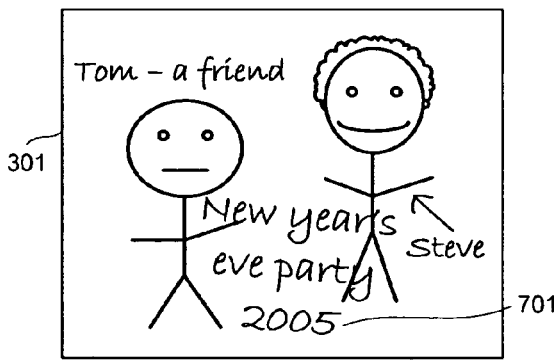

Referring to FIG. 7, the user may next decide to write on photo 301 but not associate the writing with any particular portion of photo 301. In other words, the user may additionally or alternatively decide to label the entirety of photo 301, as opposed to only a portion of photo 301. Thus, the user writes, without selecting any portion, an label 701 that states, "New Year's eve party 2005." Since no portion was selected to be associated with label 701, label 701 will be associated only with entire photo 301. As with the previous handwritten ink inputs, label 701 is recognized, and the recognition results are stored as metadata of photo 301 and/or indexed in the maintained index.

The user may thus associate one or more portions of a photo with one or more handwritten ink inputs. This may be especially useful for busy photos, such as a photo of a large group of people and the user is interested in labeling one or more of the people in the group. The handwritten labels are recognized, and the original label ink and/or the recognition results are associated with the selected portions of the photo and/or with the entirety of the photo. For instance, the original label ink and/or the recognition results may be stored as metadata of the photo along with information identifying which metadata is associated with which photo portion. In addition, the recognition results may be indexed for quick searching. As will be describe next, the user may then search for photos and/or photo portions based on the stored label metadata and/or other index. Where photo portions has been individually associated with labels, then the search results may show or otherwise indicate the individual portions that have associated relevant labels.

Searching Using Ink-Based Photo Labels

Figure 8:
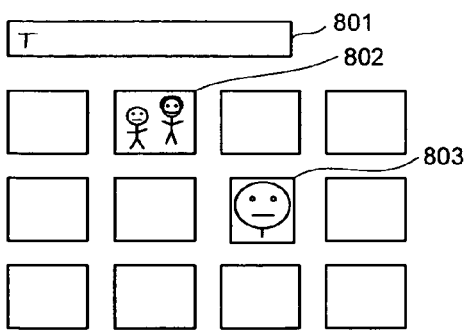
FIGS. 8-11 are sequential illustrative screenshots taken during a search of photos.

FIGS. 8-11 show various states of an illustrative search interface. In FIG. 8, an input box 801 is displayed. The user can type or hand write using stylus 166 input that is used as criteria into input box 801. In response to each letter, word, phrase, or symbol being input, computer 100 searches for those photos (and/or portions thereof) having metadata properties in accordance with what has been entered into input box 801. For example, the user has written the letter "T" into input box 801. In response, computer 100 recognizes the handwritten "T" as the text letter "T" and searches for those photos and/or portions thereof that have an associated label having a word starting with the letter "T". There are other variations on how to interpret the criterion "T." For instance, computer 100 may search for those photos/portions that have the letter "T" anywhere in an associated label (not just at the beginning of a word). Or, for instance, computer 100 may search for those photos/portions that have an associated label beginning with the letter "T." In addition, searches may be literal such that, for example, only exact matches are provided in the search results. Alternatively, searches may be fuzzy searches. More generally, computer 100 searches for those photos and/or portions thereof having an associated label meeting the input criterion.

Computer 100 may search for photos and/or photo portions in any of a number of ways. For example, as previously mentioned, computer 100 may automatically update and maintain a central index of labels (or label portions) as the user inputs the labels. The index, which may be separate from the files embodying the photos themselves, may indicate an association between each label and each photo and/or portion thereof, and may be searchable by letter, by word, by phrase, and/or by symbol contained in the labels. Where such an index is used, computer 100 may search by simply referring to the existing index. Or, computer 100 may search information that is part of or linked to the photo files. For example, computer 100 may search metadata that is part of each photo file.

Still referring to FIG. 8, computer 100 displays the results of the search, which in this case are shown as a thumbnail of each found photo and/or photo portion. For instance, the search results include thumbnail 802, which is a thumbnail of entire photo 301, and thumbnail 803, which is a thumbnail of photo portion 302. The reason that portion 302 is included as a result is that it has an associated label that meets the criterion "T." In this example, it will be assumed that a label meets a letter criterion if the label has a word beginning with or equaling the letter. Thus, in this example, the label associated with portion 302 has the word "Tom," which begins with the letter "T." The reason that entire photo 301 is included is that photo 301 is also associated with the same label with which portion 302 is associated. In other embodiments, the label associated with a photo portion is not associated with the entire photo.

Figure 9:
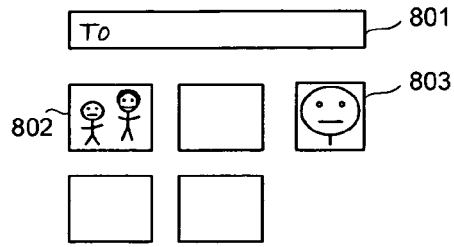

Referring to FIG. 9, the user has added the letter "o" to the criterion, such that the new criterion is "To." In response, computer 100 narrows the search results to include only those results meeting the new criterion. In this case, photo 301 (represented by thumbnail 802) and portion 302 (represented by thumbnail 803) remain.

Figure 10:
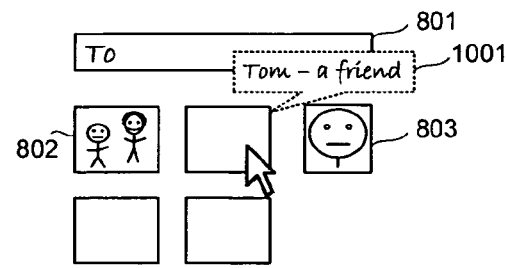

Referring to FIG. 10, the user may select one of the thumbnails (such as by hovering a displayed mouse/stylus pointer over the thumbnail) to see a preview as to why it was included as a search result. In this example, a callout 1001 is displayed containing the original handwritten label, and/or the recognized text version thereof, associated with the selected search result.

Figure 11:
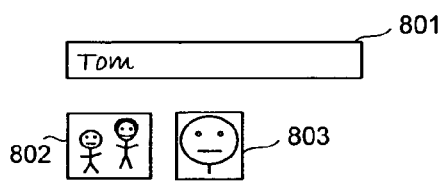

Referring to FIG. 11, the user may continue by adding the letter "m" to the search criterion, thus making the criterion "Tom." As can be seen, computer 100 in response adjusts the search results to include only those that meet the new narrowed criterion.

Figure 12:
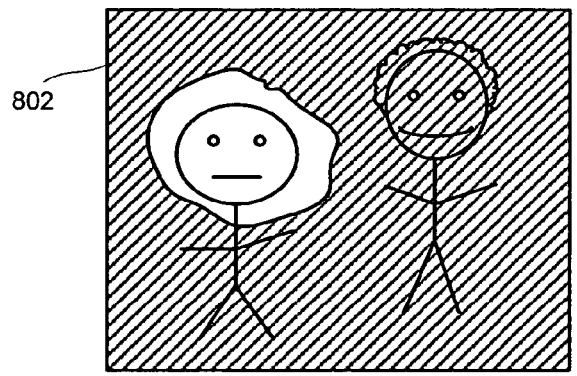
FIG. 12 is a close-up view of an illustrative search result indicating a relevant found photo portion.

In the above example, both photo 301 and its relevant portion 302 are simultaneously displayed as separate thumbnails 802, 803 in the search results. Alternatively, these search results may be combined such that a representation of photo 301 is provided including a visual indication of portion 302. For instance, thumbnail 802 may be provided such that the relevant portion 302 is highlighted or otherwise visually distinguished from the remainder of photo 301. As an example, FIG. 12 shows thumbnail 802 as having portion 302 displayed normally and the remainder of photo 301 grayed out with a lower contrast. In addition, thumbnail 802 is shown to include a visual indication of the boundary of portion 302. In this example, the boundary is shown as a solid line. However, the boundary may be indicated by a broken line or by some other visual indication.

It is noted that, although the above examples refer to search results being displayed as thumbnail versions of the photos or photo portions that they represent, the search results may be displayed in any manner desired. For example, the search results may be displayed as simple text and not in a graphical manner.

Automated Slideshow Using Ink-Based Photo Labels

Thus far, the examples have been described in the context of a user searching for photos and/or photo portions, and receiving a simultaneous set of search results. Another feature that may be provided is providing an automated slideshow of a plurality of photos and/or photo portions based on a search of ink-based photo labels. The user may institute a search as described above, however instead of or in addition to providing a simultaneous set of search results such as in FIGS. 8-11, a sequential automated slideshow may be used to display the search results.

Figure 13:
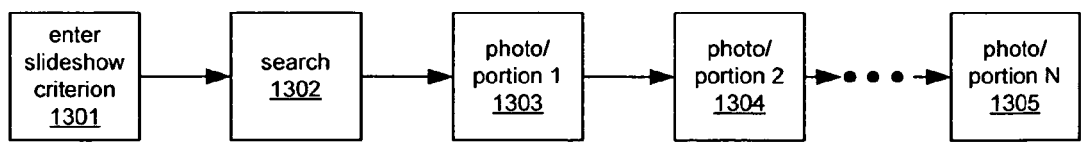
FIG. 13 is an illustrative flowchart showing steps that may be taken to perform an automated slideshow based on search results.

FIG. 13 is a flowchart that sums up a basic example of using the automated slideshow feature. The user enters a criterion for the slideshow (step 1301), such as "Tom." In response, computer 100 performs a search (step 1302) based on the criterion, in the same manner as described previously. Then, the search results are used in a slideshow by sequentially showing the first photo or photo portion result (step 1303), then the second photo or photo portion result (step 1304), etc., up to the Nth photo or photo portion result (step 1305) until all search results have been displayed. At this point, the slideshow may end or it may repeat. The slideshow may further display the search results in a particular order (such as by relevance or date modified) or randomly.

For example, say the user would like to view a slideshow that sequentially displays the search results of FIG. 11. The user may request this by, for example, selecting a slideshow mode. Alternatively, the slideshow mode may already be selected. In response to selecting the slideshow mode and/or in response to the search results 802, 803 being determined, a slideshow is presented that sequentially displays thumbnails 802 and 803 (or full versions of the photos or photo portions represented by thumbnails 802, 803).

The sequential display of search results may occur fully automatically, such as by displaying the next search result automatically after a set amount of time (e.g., a new search result is displayed every five seconds), which may be set by the user and/or by software. Further, the sequential display may be controllable by the user, such as by waiting for the user to press a keyboard key or tap stylus 166 before proceeding to the next search result. Each search result may be presented in any manner desired, such as full-screen photos/portions or smaller versions thereof. In addition, one or more various transitions (for instance, cross-fading, swiping, etc.) may be used between each displayed search result.

CONCLUSION

Thus, a way for adding and using searchable ink annotations to photos and/or photo portions has been described. As previously mentioned, extending search and organize capabilities to ink inserted into digital photos may dramatically enhance the user's photo experience.

What is claimed is:

1. A computer storage medium storing computer-executable instructions for performing steps, the steps comprising:
   receiving first input from a user that circumscribes a portion of a first photo, the portion comprising an area less than the total area of the first photo;
   receiving second input from the user that provides a label for the circumscribed portion of the first photo;
   storing the first and second input as metadata of the first photo such that the label is associated with the circumscribed portion of the first photo;
   subsequent to storing the first and second input, receiving a search request from a user that specifies search criteria for searching a first plurality of photos;
   in response to the search request, searching metadata associated with the first plurality of photos to detect a second plurality of photos that have metadata that matches the search criteria, wherein one of the second plurality of photos is the first photo and wherein the label associated with the circumscribed portion matches the search criteria; and
   in response to the search request that detected a second plurality of photos, displaying a slideshow of the second plurality of photos by sequentially displaying each of the second plurality of photos including displaying the entire first photo in the slideshow as well as, in addition to displaying each of the second plurality of photos, displaying only the circumscribed portion of the first photo in the slideshow, wherein the entire first photo is displayed during the slideshow at a time when the circumscribed portion of the first photo is not shown, and the circumscribed portion of the first photo is displayed during the slideshow at a time when the entire first photo is not shown.

2. The computer storage medium of claim 1, wherein the entire first photo is displayed by graying out the portion of the first photo that is not included in the circumscribed portion and providing a visual indication around the circumscribed portion of the first photo.

3. The computer storage medium of claim 1, wherein the first and second input comprise electronic ink and wherein the steps further include:
   recognizing the electronic ink of the second input as the text of the label.

4. The computer storage medium of claim 3, wherein the step of receiving first and second input includes displaying the first photo and receiving the electronic ink as handwritten user input written on the displayed first photo.

5. The computer storage medium of claim 4, wherein the handwritten user input corresponding to the second input is written on an area of the first photo that is different from the circumscribed portion of the first photo.

6. The computer storage medium of claim 1, wherein the first input is inputted using a lasso tool.

7. In a system having at least one application, a computer implemented method for providing labels to portions of photos such that the labeled portions of the photos are capable of being identified in a subsequent search, the method comprising:
   receiving first input from a user that circumscribes a portion of a first photo, the portion comprising an area less than the total area of the first photo;
   receiving second input from the user that provides a label for the circumscribed portion of the first photo;
   storing the first and second input as metadata of the first photo such that the label is associated with the circumscribed portion of the first photo;
   subsequent to storing the first and second input, receiving a search request from a user that specifies search criteria for searching a first plurality of photos;
   in response to the search request, searching metadata associated with the first plurality of photos to detect a second plurality of photos that have metadata that matches the search criteria, wherein one of the second plurality of photos is the first photo and wherein the label associated with the circumscribed portion matches the search criteria; and
   in response to the search request that detected a second plurality of photos, displaying a slideshow of the second plurality of photos by sequentially displaying each of the second plurality of photos including displaying the entire first photo in the slideshow as well as, in addition to displaying each of the second plurality of photos, displaying only the circumscribed portion of the first photo in the slideshow, wherein the entire first photo is displayed during the slideshow at a time when the circumscribed portion of the first photo is not shown, and the circumscribed portion of the first photo is displayed during the slideshow at a time when the entire first photo is not shown.

8. The method of claim 7, wherein the first and second input comprise electronic ink and wherein the method further comprises:
   recognizing the electronic ink of the second input as the text of the label.

9. The method of claim 8, wherein receiving first and second input further comprises displaying the first photo and receiving the electronic ink as handwritten user input written on the displayed first photo.

10. The method of claim 9, wherein the handwritten user input corresponding to the second input is written on an area of the first photo that is different from the circumscribed portion of the first photo.

11. The method of claim 7, wherein the first input is inputted using a lasso tool.

12. The computer storage medium of claim 2, wherein the visual indication comprises a dashed or a solid line.

13. The computer storage medium of claim 1, wherein the metadata corresponding to the second input is associated with the first photo as well as the circumscribed portion such that in response to the search request, a thumbnail representation of the entire first photo and a thumbnail representation of only the circumscribed portion of the first photo is displayed.

14. The computer storage medium of claim 1, wherein the sequential display of each of the second plurality of photos in the slideshow is advanced automatically without requiring the user to provide input to advance the slideshow.

15. The computer storage medium of claim 13, wherein the slideshow is initiated after the thumbnail representations of the photos are displayed and in response to user input that selects a slideshow mode for display of the second plurality of photos returned by the search.

* * * * *